United States Patent Office 3,492,371
Patented Jan. 27, 1970

3,492,371
OIL AND OZONE RESISTANT ELASTOMER BLENDS COMPRISING EDPM RUBBER
Robert E. Barrett, Baton Rouge, La., assignor to Copolymer Rubber & Chemical Corporation, a corporation of Louisiana
No Drawing. Continuation-in-part of application Ser. No. 551,517, May 20, 1966. This application Aug. 30, 1966, Ser. No. 575,972
Int. Cl. C08f 41/10; C08b 9/08
U.S. Cl. 260—889                                18 Claims

ABSTRACT OF THE DISCLOSURE

A rubber having good oil and ozone resistance formed of a curable blend of rubbery polymer and EPDM copolymer in which the latter has an effective level of unsaturation of at least 7 and preferably 10–25 carbon-to-carbon double bonds per 1000 carbon atoms.

---

This application is a continuation-in-part of my copending application Ser. No. 551,517, filed May 20, 1966, now abandoned, for Oil and Ozone Resistant Elastomers.

This invention relates to novel curable elastomeric blends containing highly unsaturated oil resistant rubbers and rubbers prepared by polymerizing monomeric mixtures of alpha monoolefins and polyenes. The invention further relates to the cured elastomeric blends of the invention.

Highly unsaturated synthetic rubbers such as polychloroprene and nitrile rubber are employed in the manufacture of a wide variety of rubber articles which, when in use, will be contacted with oils, greases, and hydrocarbon solvents. While these rubbers are oil resistant, they are subject to attack by elemental oxygen and especially ozone. The resistance to oxidation and oxidative degeneration may be improved by the addition of an antioxidant, or antiozonant, but this increases the cost of the rubber and also many of the antioxidants and antiozonants presently in use are staining.

It is known that oxidation resistant elastomers may be prepared by interpolymerizing a monomeric mixture composed of ethylene and at least one higher alpha monoolefin in solution in an organic solvent and in the presence of a Ziegler polymerization catalyst. However, the resulting saturated elastomers are not sulfur vulcanizable and substances other than sulfur must be used for curing purposes, such as the organic peroxides. Efforts have been made to provide a low degree of ethylenic unsaturation by including a reactive monomeric compound having a plurality of carbon-to-carbon double bonds in the mixture of alpha monoolefins to be polymerized. The resulting interpolymers contains about 2–5 carbon-to-carbon residual double bonds per 1000 carbon atoms, and they may be readily vulcanized with sulfur following prior art practices. The resulting vulcanized elastomeric products have excellent ozone resistance and are not subject to rapid oxidative degeneration, but they are not oil resistant.

In the interest of simplifying the discussion hereinafter, the sulfur curable elastomers prepared by interpolymerizing a monomeric mixture containing ethylene, a higher alpha monoolefin containing 3–16 carbon atoms and a polyene will be referred to as ethylene-propylene-diene monomer (EPDM) rubber. However, when this term is used, it is understood that interpolymerizable straight chain alpha monoolefins containing 4–16 and preferably 4–10 carbon atoms may be substituted for at least part of the propylene, and that interpolymerizable polyenes in general may be substituted for all or part of the diene monomer. The effective unsaturation level in EPDM rubbers may be as low as 2 and as high as 60–100 carbon-to-carbon double bonds per 1000 carbon atoms. The EPDM rubbers having a low effective unsaturation level, i.e., less than 7 and usually 2–5 carbon-to-carbon double bonds per 1000 carbon atoms, may be prepared following the same general procedure as described hereinafter for the EPDM rubbers having an effective high unsaturation level, i.e., at least 7 carbon-to-carbon double bonds per 1000 carbon atoms, with the exception of providing a monomeric mixture to be polymerized which contains less of the polyene. Therefore, the polyene is present in the reaction mixture during the polymerization in an amount to result in the desired content of chemically bound polyene in the resulting polymer, and to thereby provide the desired effective unsaturation level.

Cured blends prepared from the highly unsaturated oil resistant rubbers and sulfur vulcanizable EPDM rubbers having a relatively low unsaturation level of 2–5 carbon-to-carbon double bonds per 1000 carbon atoms have markedly lower oil resistance than would be predicted. The EPDM rubber seems to act as a filler in the blend, and it does not cocure and produce the desired combination of excellent ozone and oil resistance in the cured articles prepared therefrom. The present invention provides a blend prepared from a special EPDM rubber and oil resistant rubbers which, for the first time, overcomes the disadvantages and shortcomings of the prior art blends.

It is an object of the present invention to provide novel curable blends of oil resistant rubbers and EPDM rubber.

It is a further object to provide novel curable blends prepared from polychloroprene and EPDM rubber which have good oil resistance in combination with outstanding ozone resistance.

It is still a further object to provide novel sulfur vulcanizable blends of nitrile rubber and EPDM rubber which have unexpectedly good ozone and oil resistance in combination.

It is still a further object to provide the novel cured elastomeric blends of the invention.

Still other objects and advantages of the invention will be apparent to those skilled in the art upon reference to the following detailed description and the accompanying examples.

The blends of the invention may contain about 1–95 parts by weight of the EPDM rubber for each 99–5 parts by weight of the highly unsaturated oil resistant rubber to be described more fully hereinafter. In most instances, it is preferred that the EPDM rubber be present in an amount of about 1–50 parts by weight for each 99–50 parts by weight of the oil resistant rubber. When it is desired to impart outstanding ozone resistance to the blend, then the EPDM rubber should be present in an amount of at least 15 parts by weight for each 85 parts by weight of the oil resistant rubber, and preferably in an amount of about 15–30 parts by weight for each 85–70 parts by weight of the oil resistant rubber.

Examples of the highly unsaturated oil resistant rubbers for use in preparing the blends include rubbery homopolymers of homopolymerizable halogenated conjugated diolefins containing about 4–10 carbon atoms, rubbery interpolymers of conjugated diolefins or halogenated conjugated diolefins containing 4–10 carbon atoms and ethylenically unsaturated nitriles interpolymerizable therewith such as acrylonitrile and alkyl-substituted acrylonitriles wherein the alkyl group contains 1–5 carbon atoms, and mixtures thereof. In some instances, rubbery interpolymers of the above halogenated conjugated diolefins with a small percentage of an alpha monoolefin may be used, such as interpolymers containing 1–25% and preferably 1–10% by weight of chemically bound styrene, vinyl naphthalene, propylene or alpha monoolefins in general containing 3–5 carbon atoms. Examples of conjugated diolefins include 1,3-butadiene, isoprene, 2,3-dimethyl-1,3-butadiene and piperylene. Examples of halogenated conjugated diolefins include chloroprene and 2,3-dichloro-1,3-butadiene, and the corresponding bromo- and fluoro-derivatives. Examples of ethylenically unsaturated nitriles include acrylonitrile, methacrylonitrile, ethacrylonitrile, and the corresponding straight or branched chain alkyl-substituted acrylonitriles containing 3, 4 or 5 carbon atoms. The preferred oil resistant rubbers include polychloroprene, copolymers of chloroprene and acrylonitrile, and copolymers of 1,3-butadiene and acrylonitrile, methacrylonitrile or ethacrylonitrile.

Interpolymers containing about 5–60% by weight of chemically bound nitrile monomer and 95–40% by weight of chemically bound conjugated diolefin and/or halogenated diolefin monomer may be used. However, within this range, better results are obtained when the chemically bound nitrile monomer content is at least 15% or 20% by weight, and for best results at least 35–45% by weight. A copolymer of 1,3-butadiene and acrylonitrile containing about 30–50% by weight of chemically bound acrylonitrile is usually preferred. Copolymers of chloroprene and acrylonitrile containing about 30–50% by weight of bound acrylonitrile also may be used.

As a general rule, better oil resistance is obtained when the blends of the invention contain higher percentages by weight of chemically bound nitrile monomer and/or halogenated conjugated diolefin monomer. For example, each 100 parts by weight of the blend should contain at least 15 or 20 parts by weight and preferably at least 25–40 parts by weight, of chemically bound nitrile monomer when a nitrile rubber is used in preparing the blend. Good results are obtained when each 100 parts by weight of the blend contains about 20–35 parts by weight of the chemically bound nitrile monomer, and the best results with at least 33 parts by weight of the nitrile monomer. When a homopolymer or interpolymer of a halogenated diolefin monomer is used, the blend may contain the halogenated diolefin monomer chemically bound therein in the amounts set out above for the nitrile monomer, but much larger amounts may be present such as up to about 50–95 parts by weight and preferably about 60–85 parts by weight for each 100 parts by weight of the blend.

The preparation and properties of the highly unsaturated oil resistant rubbers are well known and are described in a large number of issued United States patents and other publications, including the following: Introduction to Rubber Technology, edited by M. Morton, Reinhold Publishing Corporation, New York (1959); Synthetic Rubber Technology, Volume I, by W. S. Penn, Maclaren and Sons, Ltd., London (1960); Rubber, Fundamentals of Its Science and Technology, J. LeBras, Chemical Publishing Company, Inc., New York (1957); and Linear and Steroregular Addition Polymers, N. G. Gaylord et al., Interscience Publishers, New York (1959). Typical commercially available elastomers are described in the text "Compounding Ingredients For Rubbers," 3rd edition, Cuneo Press of New England, Cambridge, Mass. The above publications are incorporated herein by reference.

The EPDM elastomers used in preparing the blends of the invention are the products resulting from interpolymerizing in solution in an organic polymerization solvent and in the presence of a Ziegler catalyst a monomeric mixture containing ethylene, at least one alpha monoolefin having 3–16 carbon atoms, and preferably a straight chain alpha monoolefin having 3–10 carbon atoms, and a polyunsaturated bridged-ring compound having at least one carbon-to-carbon double bond in a bridged ring. In general, the basic reaction conditions may be the same as those employed in the prior art for preparing EPDM rubbers, except that a much larger amount of the bridged ring compound is reacted to thereby produce a highly unsaturated EPDM rubber.

It is preferred that the EPDM elastomers for the blends be prepared from a monomeric mixture containing ethylene, a higher straight chain alpha monoolefin such as propylene and a polyunsaturated bridged-ring compound such as a hydrocarbon, in proportions to produce a polymer having good elastomeric properties and a theoretical or calculated unsaturation level of at least 7 carbon-to-carbon double bonds per 1000 carbon atoms in the polymer. For example, the elastomer may contain chemically bound therein molar ratios of ethylene to propylene varying between about 80:20 and 20:80. The bridged-ring compound may be chemically bound therein in an amount to provide a calculated unsaturation level of 7–30, and preferably about 10–15 or 10–20 carbon-to-carbon double bonds per 1000 carbon atoms in the polymer. The specific calculated unsaturation level that is selected in a given instance will depend upon the desired rate of cure or other property, but usually an EPDM rubber having about 10–25 carbon-to-carbon double bonds per 1000 carbon atoms is preferred.

In instances where it is desired to prepare a tetrapolymer, or a polymer from more than five different monomers, then one or more alpha monoolefins containing 4–16 and preferably 4–10 carbon atoms may be substituted for an equal molar quantity of bound propylene in the above-mentioned monomer compositions. Straight chain alpha monoolefins are usually preferred. When preparing tetrapolymers, the range of the fourth monomer will normally be about 5–20 mole percent, but smaller amounts may be present such as 1, 2, 3 and 4 mole percent.

Examples of bridge-ring compounds include the polyunsaturated derivatives of bicyclo(2,2,1) heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring compounds include polyunsaturated derivatives of bicyclo(2,2,2)octane as represented by bicyclo(2,2,2) octa-2,5-diene, polyunsaturated derivatives of bicyclo(3,2,1)octane, polyunsaturated derivatives of bicyclo(3,3,1)nonane, and polyunsaturated derivatives of bicyclo(3,2,3)nonane. At least one double bond is present in a bridged ring of the above compounds, and at least one other double bond is present in a bridged ring or in a side chain. Examples of polyunsaturated bridged-ring hydrocarbons and their use in the preparation of prior art EPDM rubbers are found in U.S. Patents Nos. 2,933,480, 3,093,620, 3,093,621 and 3,211,709, the disclosures of which are incorporated herein by reference. The corresponding halogen-substituted, and especially chlorine-substituted, bridge ring compounds may be used. Examples of halogen-containing compounds are disclosed in U.S. Patents Nos. 3,220,998 and 3,222,330.

The EPDM elastomers which are especially preferred in preparing the blends of the invention include polymers which contain chemically bound therein molar ratios of ethylene to propylene varying between 70:30 and 55:45. Specific examples of polyenes which may be used include 5 - methylene - 2 - norbornene, 5 - ethylidene - 2-norbornene, 5 - n - propylidene - 2 - norbornene, 5 - isopropylidene - 2 - norbornene, 5 - n - butylidene - 2 - norbornene, 5-isobutylidene-2-norbornene, dicyclopentadiene, the methyl butenyl norbornenes such as 5 - (2-methyl - 2 - butenyl) - 2 - norbornene or 5 - (3 - methyl-2-butenyl)norbornene, and 5 - (3,5-dimethyl-4-hexenyl)-2-norbornene. The elastomer prepared from 5-ethylidene-2-norbornene is much preferred as it has outstanding properties and produces many unusual and unexpected results. As a result, this elastomer is in a class by itself.

For some reason which is not fully understood at the present time, elastomers prepared from monomeric mixtures containing ethylene, at least one higher alpha monoolefin having 3–16, and preferably 3–10, carbon atoms such as propylene, and certain polyunsaturated bridged ring compounds such as 5-ethylidene-2-norbornene, have a much more rapid cure rate when cured with sulfur than would be predicted from the calculated or theoretical carbon-to-carbon double bond content. In such instances, the apparently higher unsaturation level is embraced within the term "effective" unsaturation level of the elastomer in the specification and claims. As is set out in detail hereinafter, the elastomers described herein may be analyzed to determine the effective unsaturation level, as expressed in carbon-to-carbon double bonds per 1000 carbon atoms, by the consumption of bromine, correcting for the substitution reaction by a kinetic method based on the spectrophotometric method developed by Siggia, et al., Anal. Chem. 35, 362 (1963). The effective carbon-to-carbon double bond content per 1000 carbon atoms in the elastomer, which may or may not be equal to the actual carbon-to-carbon double bond content, is calculated from the resulting data to determine the effective unsaturation level. The effective unsaturation level may be, for example, at least 7, and preferably at least 10, carbon-to-carbon double bonds per 1000 carbon atoms in the elastomer. The elastomers may have effective unsaturation levels of 7–60, and for better results 7–25, or 7–30 carbon-to-carbon double bonds per 1000 carbon atoms. Usually elastomers having effective unsaturation levels of 10–60, and for better results 10–25 or 10–30, carbon-to-carbon double bonds per 1000 carbon atoms are more compatible. Elastomers having effective unsaturation levels of about 10–15 or 10–20 carbon-to-carbon double bonds per 1000 carbon atoms often give the best results.

The polymerization solvent may be any suitable inert or saturated hydrocarbon which is liquid and relatively non-viscous under the reaction conditions, including the prior art solvents for the solution polymerization of monoolefins in the presence of a Ziegler catalyst. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

In general, any suitable prior art Ziegler-type catalyst may be used which is known to produce a satisfactory elastomer. Ziegler catalysts are disclosed in a large number of issued patents, such as U.S. Patents Nos. 2,933,480, 3,093,620, 3,093,621, 3,211,709 and 3,113,115. Examples of Ziegler catalysts include metal organic coordination catalysts prepared by contacting a compound of a metal of Groups IVa, Va, VIa, and VIIa of the Mendelejeff periodic chart of the elements, as typified by titanium, vanadium and chromium halides, with an organometallic compound of a metal of Groups I, II or III of the Mendelejeff periodic chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually 1 mol of vanadium oxychloride for each 8–20 mols of the alkyl aluminum sesquichloride.

The blends may be cured following prior art procedures, and special curing techniques are not necessary. As a general rule, the compounding ingredients and the procedure which are normally used in curing the highly unsaturated oil resistant rubber component are also satisfactory in curing the blend. Various curing procedures, including the materials and the quantities thereof to be employed, are described in a large number of publications which are well known in the art. These publications include those previously mentioned. Additional publications include Principals of High Polymer Theory and Practice, Schmidt et al., McGraw-Hill Book Company, New York (1948); Chemistry and Technology of Rubber, Davis et al., Reinhold Publishing Comporation, New York (1937); The Applied Science of Rubber, edited by W. J. S. Naunton, published by Edward Arnold, Ltd., London (1961), and the encyclopedia of Chemical technology, Kirk and Othmer, published by Innerscience Encyclopedia, Inc., New York (1953).

In instances where the blend is prepared from nitrile rubber and EPDM rubber having an unsaturation level of 7–30 carbon-to-carbon double bonds per 1000 carbon atoms, curing is preferably accomplished with heat activated curing agents including, for example, sulfur or sulfur-bearing compounds which provide sulfur at the elevated temperature used in curing. Sulfur is the preferred vulcanizing agent, and it is usually employed in an amount of about 0.5–3 and preferably about 1–2 parts by weight per 100 parts by weight of rubber in the blend. Zinc oxide, litharge and other metal oxides may be present in an amount of, for example, about 2–10 parts by weight per 100 parts by weight of rubber (p.h.r.). Vulcanization accelerators normally used with nitrile rubbers may be present including the sulfenamide, aldehydeamine and guanidine accelerators, and specifically tetramethylthiuram monosulfide, tetramethylthiuram disulfide, the zinc salt of dimethyldithiocarbanic acid, the piperidine salt of pentamethylenedithiocarbamic acid, N,N-diethylthiocarbamyl-2-mercaptobenzothiazole and 2-mercaptoimidazoline. The vulcanization may be, for example, at a temperature of about 250–350° F. for a period of about 15–120 minutes. Reinforcing and pigmenting agents such as carbon black may be present in an amount of, for example, 5–100 parts by weight, or fatty acids or soaps in an amount of, for example, 0.5–3 parts by weight per 100 parts by weight of rubber. Softeners and plasticizers also may be present, such as aromatic oils, esters and polar-type derivatives, including coumarone-indene resin, dibutyl phthalate, dibutyl sebacate, dioctyl phthalate, octadecene nitrile, tricresyl phosphate and tributoxyethyl phosphate. Such plasticizers and softeners may be present in an amount of, for example, about 5–100 parts by weight per 100 parts by weight of rubber.

In instances where the blend contains an oil resistant rubber prepared from a halogenated conjugated diolefin such as chloroprene, then different curing agents and curing conditions may be preferred. The sulfur or sulfur-bearing compounds and accelerators that are useful in the vulcanization of nitrile rubbers may be present, but the rate of cure is slow and the usual curing agents and curing conditions for polychloroprene rubber give better results. Polychloroprene rubber may be cured by heat alone without any added curing agent, but preferably metallic oxides are present such as the usual combination of zinc oxide and magnesium oxide. In some instances, a mixture may be used of the metal oxides, sulfur and/or sulfur-providing compounds, and the typical rubber accelerators mentioned herein such as the guanidines, tetramethylthiuram monosulfide, 2-mercaptobenzothiazole, di-o-tolylguanidine salt of dicatechol borate, 2-mercaptoimidazoline and p,p'-diaminodiphenylmethane. Reinforcing or pigmenting agents such as carbon black, whiting, calcium silicate and magnesium carbonate, or the softeners and plasticizing agents described above, may be present in the amounts mentioned for the nitrile rubbers.

The compounding ingredients and curing procedures mentioned herein are intended to be illustrative examples only. It is understood that the compounding ingredients and curing conditions which are normally employed in the prior art for the specific oil resistant rubber used in preparing the blend may be used in compounding and curing the blend of the present invention. Therefore, upon reference to the texts mentioned herein, it is possible to arrive at a wide variety of specific ingredients and conditions for use in compounding and curing the blends. Additionally, in the curing of blends containing polymers of halogenated conjugated dienes such as chloroprene and nitrile rubbers, it is often possible to employ a combination of the curing agents and conditions which have been used in the prior art for the curing of the individual polymers.

The cured blends prepared in accordance with the present invention may be used for the same purposes as the oil resistant rubbers have been used heretofore. Additionally, the cured blends may be used in environments where a combination of oil resistance and ozone resistance are of importance, such as in gaskets, rubber hoses, electrical insulations, etc. for use in the vicinity of internal combustion engines.

The blends described herein may be prepared from the component rubbers by any suitable convenient prior art procedure. For example, latices or organic solvent solutions prepared from the component rubbers may be admixed in the desired ratios, and the resulting blends of rubber latices or solutions may be used as such, or the blends may be coagulated to produce solid rubber blends. The blends also may be prepared conveniently from the solid component rubbers by admixing the same in desired ratios on a prior art rubber mill, such as on a Banbury Mill.

The foregoing detailed description and the following specific examples are for purposes of illustration only, and are not intended as being limiting to the spirit or scope of the appended claims.

EXAMPLE I

This example illustrates the preparation of an ethylene-propylene - 5 - ethylidene - 2 - norbornene terpolymer having an unsaturation level of 7.2 carbon-to-carbon double bonds per 1000 carbon atoms, and the preparation of a latex therefrom.

A one-half gallon Sutherland reactor was equipped with a high speed, heavy duty, air-driven motor, cooling coils, thermometer, temperature regulator, pressure regulator, injection port, and additional openings for monomers, catalysts and solvents fed to and from the reactor. A tube extended to the bottom of the reactor for removal of the polymer cement, which was produced on a continuous basis.

The reactor was purged for 12 hours with dry nitrogen and then the temperature was raised from ambient temperature to about 60° C. while passing hot water through the reactor coils. The reactor was flushed with propylene for 14 minutes and then the temperature was lowered to 30° C. and maintained at this temperature throughout the polymerization.

One liter of dry, Esso chemical grade hexane was added to the reactor and propylene was added until the reactor pressure was about 42.2 inches of mercury. At this time, 1.3 milliliters of a 1.5 molar solution of ethylaluminum sesquichloride were added as an additional purge for water. The pressure was then increased to 61 inches of mercury by addition of ethylene, and 6.73 millimols of 5-ethylidene-2-norbornene were added. The monomer feeds were shut off and the catalyst components, i.e., a 0.0363 molar solution of vanadium oxychloride and a 0.351 molar solution of ethylaluminum sesquichloride, were fed to the reactor at a constant rate until a drop in the reactor pressure was noted. The aluminum to vanadium mole ratio was 12:1. At this time, the gaseous monomers were fed into the reactor through a calibrated rotometer at a rate of about 1497 cc. per minute, of which 693 cc. were ethylene and 804 cc. were propylene. The 5-ethylidene-2-norbornene was added as a 0.30 molar hexane solution in an amount to provide an effective unsaturation level in the resulting polymer of 7.2 carbon-to-carbon double bonds per 1000 carbon atoms.

The polymerization was controlled by the catalyst pump which added the catalyst on demand as the pressure increased, thereby maintaining 61 inches of mercury pressure throughout the polymerization. When the solution became approximately 6% polymer, solvent which was saturated at room temperature with ethylene under 40 pounds per square inch pressure was fed into the reactor at the rate of 27 cc. per minute, and the polymer cement was removed continuously. The rate of production of polymer was about 85–90 grams of polymer per hour. At this time, the ethylene and propylene feeds were adjusted to 331 cc. per minute and 1804 cc. per minute respectively, and the feed rate of the solution of 5-ethylidene-2-norbornene was adjusted correspondingly, i.e., to about 4.6 cc. per minute to compensate for the unreacted monomers removed with the cement.

The solution of cement as removed from the reactor was fed into a Waring Blendor containing water where it was intimately mixed to kill the catalyst. The cement was then washed three times with equal volumes of water to remove the catalyst residue, and fed into a container filled with hot circulating water. Steam was admitted to the container to superheat the cement and remove the solvent and unreacted monomers. The resulting coagulated polymer in the form of rubber crumb was collected on a screen, washed and chopped up in a Waring Blendor, and dried at 90° C. The dried polymer was highly unsaturated and had an effective unsaturation level as determined by the consumption of bromine by the method described hereinafter of 7.2 double bonds per 1000 carbon atoms, and a Mooney value of 96 $ML_4$. The polymer was used in preparing a latex following the procedure set out below.

A benzene solution containing 5% by weight of the above prepared polymer was emulsified in an Eppenbach colloid mill. The feed to the colloid mill contained on a weight basis 100 parts of polymer in 1900 parts of benzene, 5 parts of potassium oleate, 0.5 part of Daxad-15 (polymerized sodium salt of aryl alkyl sulfonic acid), 0.3 part of tripotassium phosphate, and 2000 parts of water. The mixture was passed through the colloid mill for 30 minutes at No. 12 setting, and the resulting latex was then stripped free of the benzene solvent by steam distillation and concentrated to 27.2% solids in a disc-type concentrator. The latex was stable and had an average particle size of 2900 angstroms. The latex was blended with nitrile rubber in the following examples.

EXAMPLE II

This example illustrates the preparation of a 1,3-butadiene-acrylonitrile rubber latex for use in preparing the blends of the invention.

The latex was prepared in a 500 gallon pilot plant reactor. The reactor temperature was 5–10° C., the reaction time was 7.8 hours, and the reaction was carried out to a monomer conversion of 60% by weight. The following recipe was used—

| Material: | Parts by weight |
|---|---|
| 1,3-butadiene | 58 |
| Acrylonitrile | 42 |
| CP-64 emulsifier [1] | 5.0 |
| Tamol N emulsifier [2] | 0.1 |
| P-35 mercaptan [3] | 0.37 |
| PMHP initiator [4] | 0.05 |
| SFS [5] | 0.05 |
| Activator No. 201 [6] | 0.15 |
| $Na_2S_2O_4$ | 0.02 |
| Tri-sodium phosphate | 0.2 |
| KCl | 0.2 |
| $H_2O$ | 180 |

[1] CP-64—Hydrogenated tallow acid (primarily stearic and palmitic acid).
[2] Tamol N—Sodium salt of condensed naphthylene sulfonic acid.
[3] P-35 Mercaptan—Blend of tertiary mercaptans which average 10½ carbons per chain.
[4] PMHP—Paramenthane hydroperoxide.
[5] SFS—Sodium formaldehyde sulfoxylate.
[6] Activator No. 201—Complex between $FeSO_4 \cdot H_2O$ and tetrasodium salt of ethylene diamine-tetraacetic acid.

The unreacted monomers were stripped from the resulting latex by steam distillation, and then the latex was concentrated by evaporation to a total solids content of 26.7% by weight. The latex had an average particle size of 750 angstroms, a Mooney value of 112 $ML_4$, and the bound acrylonitrile content was 37.8% by weight. The latex was used in preparing the blends in the following examples.

EXAMPLE III

This example illustrates the preparation and testing of blends prepared in accordance with the invention. The blend of this example is prepared from the ethylene-propylene-5-ethylidene-2-norbornene terpolymer latex following the general procedure of Example I and the 1,3-butadiene-acrylonitrile latex of Example II.

A physical blend is made by adding 25 parts by dry weight of the latex following the general procedure of Example I to 75 parts by dry weight of the latex of Example II, and then 1.25 parts of Agerite Geltrol (phosphited polyalkyl polyphenol) is added as an antioxidant. After thorough mixing, the blend is coagulated by creaming with 20 parts of sodium chloride, followed by precipitation in a 1.5% by weight sodium chloride solution with the pH being adjusted to 3.0 using sulfuric acid. The soap and organic acid content of the resulting blend of solid rubber is lowered by slurrying the crumb in a bath having a pH of 11, followed by a water wash.

The solid rubber blend is compounded using the following recipe.

| Material: | Parts by weight |
|---|---|
| Rubber blend | 100.0 |
| Semi-reinforcing furnace black | 40.0 |
| Zinc oxide | 5.0 |
| Stearic acid | 1.5 |
| Benzothiazyl disulfide | 1.0 |
| Spider sulfur (fine dispersion of sulfur) | 1.5 |

The above ingredients are thoroughly mixed in a rubber mill. The compounded blend is then cured at 310° F. for 30 minutes.

Physical properties including the tensiled strength, elongation, modulus, hardness, oil swell and ozone rating are determined by the usual test procedures. The ozone test is over a 70 hour period at 100° F. with 0.5 part per million of ozone concentration in the atmosphere. The oil swell test is over a 70 hour period at 100° C. with ASTM No. 3 oil.

In order to provide comparative data, two additional rubbers are prepared and tested in accordance with the general procedure followed for the blend of the invention. One rubber is prepared from the latex of Example II alone. The other rubber is a blend prepared from, on a dry solids basis, 25 parts of a latex of a styrene-1,3-butadiene rubber containing 23% bound styrene, and 75 parts of the latex of Example II. The resulting solid 1,3-butadiene-acrylonitrile rubber and the blend of SBR rubber and 1,3-butadiene-acrylonitrile rubber are compounded and tested following the procedure of this example.

The following data are obtained:

| Polymer description (dry-weight basis) | 25% like Example I terpolymer (7.2 C=C/1,000 C); 75% butadiene-acrylonitrile copolymer | 25% SBR; 75% butadiene-acrylonitrile copolymer | 100% butadiene acrylonitrile copolymer |
|---|---|---|---|
| Chemical analysis of rubber: | | | |
| Organic acid | 0.43 | 0.55 | 0.61 |
| Soap | 0.16 | 0.29 | 0.49 |
| Ash | 0.15 | 0.22 | 0.28 |
| Physical Properties Cure: 310° F., 30 minutes: | | | |
| Tensile | 2,625 | 3,000 | 2,950 |
| Elongation | 470 | 500 | 440 |
| Modulus | 1,950 | 1,950 | 2,150 |
| Hardness | 66 | 64 | 67 |
| Ozone rating | 1 | 8 | 8 |
| Oil swell (%) | 40.8 | 40.2 | 14.5 |
| Acrylonitrile (percent content bound in blend) | ~28 | ~28 | 37.8 |

The above data show that the blend of the invention has about the same oil resistance as a similar blend prepared from SBR. Also, the physical properties compare favorably. This is surprising as blends prepared from 1,3-butadiene-acrylonitrile rubber and EPDM having an unsaturation level of less than 7 double bonds per 1000 carbon atoms have markedly lower oil resistance, and much lower physicals. The blend of the invention also has an ozone rating of 1, while the ozone ratings for the other two rubbers are 8.

EXAMPLE IV

This example illustrates the inferior results that are obtained when using a blend containing an ethylene-propylene-5-ethylidene-2-nonbornene terpoylmer having an effective unsaturation level of only 4.7 double bonds per 1000 carbon atoms.

The ethylene-propylene-5-ethylidene-2-norbornene terpolymer used in the blend of this example was prepared following the general procedure of Example I, with the exception of reducing the feed of the 5-ethylidene-2-norbornene monomer to provide an effective unsaturation level of 4.7 carbon-to-carbon double bonds per 1000 carbon atoms. A latex was prepared from the resulting terpolymer following the procedure set out in Example I, and concentrated to a similar solids content.

A blend was prepared from 25 parts by dry weight of the latex of this example and 75 parts by dry weight of the latex of Example II following the procedure of Example III. The resulting blend contained 25% by weight of the terpolymer of this example and 75% by weight of the 1,3-butadiene-acrylonitrile copolymer of Example II. The blend was compounded, cured and tested in accordance with Example III.

The following data were obtained—

Chemical analysis of rubber blend:
| | |
|---|---|
| Organic acid | 1.34 |
| Soap | 0.25 |
| Ash | 0.17 |

Physical properties cure (310° F., 30 minutes):
| | |
|---|---|
| Tensile | 2400 |
| Elongation | 420 |
| Modulus | 1825 |
| Hardness | 66 |
| Ozone Rating | 0 |
| Oil Swell (percent) | 53.5 |
| Acrylonitrile (percent bound in blend) | 28 |

When the above data are compared with the data of Example III, it may be seen that blends prepared from EPDM rubbers having a low level of unsaturation such as 4.7 carbon-to-carbon double bonds per 1000 carbon atoms have markedly lower oil resistance and lower physical properties.

EXAMPLE V

An ethylene-propylene-5-(2-methyl-2-butenyl)-2-norbornene terpolymer having an effective unsaturation level of 5.5 carbon-to-carbon double bonds per 1000 carbon atoms was used in preparing the blend of this example.

The above terpolymer was prepared following the general procedure of Example I, with the exception of substituting 5-(2-methyl-2-butenyl)-2-norbornene for the 5-ethylidene-2-norbornene, and adjusting the feed rate thereof to provide an effective unsaturation level in the resulting terpolymer of 5.5 carbon-to-carbon double bonds per 1000 carbon atoms. A latex was prepared from the resulting terpolymer following the procedure of Example I, and concentrated to a similar solids content.

A solid blend of the terpolymer of this example and the butadiene-acrylonitrile copolymer of Example II was prepared following the procedure of Example III. The resulting blend contained 25 parts by weight of the terpolymer of this example, and 75 parts by weight of the butadiene-acrylonitrile copolymer of Example II.

The blend was then componded and tested in accordance with Example III. The following results were obtained—

Chemical analysis of the blend:
  Organic acid _____ 0.91
  Soap _____ 0.12
  Ash _____ 0.61
Physical properties cure (310° F., 30 minutes):
  Tensile _____ 2200
  Elongation _____ 430
  Modulus _____ 1500
  Hardness _____ 67
  Ozone Rating _____ 1
  Oil Swell (percent)_____ 50.8
  Acrylonitrile (percent bound in blend) _____ ~28

The above data also show that low unsaturation levels in the EPDM rubber results in poor physicals and poor oil resistance in the blend. Thus, only EPDM rubbers having an effective unsaturation level of at least 7 carbon-to-carbon double bonds per 1000 carbon atoms will produce a blend which has a combination of good oil resistance, excellent ozone resistance, and relatively high physical properties.

EXAMPLE VI

Three ethylene/propylene/5-ethylidene-2 norbornene (EPEN) terpolymers having effective unsaturation levels of 8.4, 15 and 45 carbon-to-carbon double bonds per 1000 carbon atoms are prepared, blended with butadiene acrylonitrile (BAN) copolymer in amounts of 10%, 17.5% and 25% by weight, compounded, cured and tested in accordance with the general procedures of Examples I through III.

The following data are obtained:

level by the consumption of bromine correcting for the substitution reaction by a differential kinetic method based on the spectrophotometric method developed by Siggia et al., Anal. Chem. 35, 362 (1963). The basis of the method is the determination of the differences in rates of addition and substitution of bromine ($Br_2$) with ethylenically unsaturated linkages. The rate of reaction is determined by monitoring the disappearance of the bromine photometrically as a function of time. A sharp break occurs when the rapid addition reaction to the carbon-to-carbon double bonds is complete and the slow substitution reaction continues. Extrapolation of a kinetic plot (pseudo first order) to a time of zero ("0") will give the amount of bromine remaining after addition to the carbon-to-carbon double bonds was complete. The change in bromine concentration is taken as the measure of the effective unsaturation level in the elastomer.

Materials (1) Bromine solution, 0.0125 molar in $CCl_4$ (2.0 g. of $Br_2$/liter of $CCl_4$).

(2) Aqueous potassium iodide solution containing 10 grams of KI in 100 ml. of water.

(3) Mercuric chloride catalyst solution containing 0.2 g. of mercuric chloride dissolved in 100 ml. of 1,2-dichloroethane.

(4) Starch indicator solution.

(5) Aqueous sodium thiosulfate solution, 0.01 normal accurately standarized.

(6) Carbon tetrachloride, reagent grade.

(7) Spectrophotometer (visible range) having sample and reference cells that can be stoppered.

(8) Stopwatch (if a non-recording photometer is used).

Calibration (1) With the standard 0.01 N $Na_2S_2O_3$ solution, titrate to the starch-iodine endpoint duplicate 10.00 ml. samples of the 0.0125 M bromine solution to which 5 ml. of the 10% KI solution and 25 ml. of distilled water have been added.

(2) From the standard 0.0125 M bromine solution, prepare a series of five calibration standards of the following concentrations: 0.5, 1, 2, 3, and 4 millimoles of $Br_2$/liter.

(3) Determine the absorbance in the sample cell of each of the five calibration standards at a wavelength setting of 415 m$\mu$[1] versus $CCl_4$ in the reference cell. Then prepare a plot from the resulting data of absorbance versus the exact concentration of $Br_2$ contained in the calibration standards, plotted as millimoles of $Br_2$/liter, to obtain a calibration curve.

(4) Determine the slope of the calibration curve thus obtained for use in the equation:

$$Br_2 \text{ in millimoles/liter} = \text{absorbance} \times \frac{1}{\text{slope of calibration curve}}$$

Analysis (1) Dissolve about 1.25 grams of the dry polymer to be analyzed in 50 ml. of $CCl_4$ (or take sufficient polymer

| EPEN Terpolymer C=C | 10% EPEN Terpolymer; 90% BAN Copolymer | | 17.5% EPEN Terpolymer; 82.5% BAN Copolymer | | | 25% EPEN Terpolymer; 75% BAN Copolymer | | |
|---|---|---|---|---|---|---|---|---|
| | Percent Oil Swell | Tensile Strength | Ozone Rating | Percent Oil Swell | Tensile Strength | Ozone Rating | Percent Oil Swell | Tensile Strength |
| 8.4 | 22.8 | | | 31.8 | 2,850 | 0 | | 2,875 |
| 15 | 28.4 | 3,400 | 5 | 31.7 | 3,350 | 3 | 30.3 | 3,425 |
| 45 | | | | | 3,175 | | | |

The above data also show that ethylene/propylene/5-ethylidene-2-norbornene terpolymers having high effective unsaturation levels produce blends having high physical properties and good oil resistance.

The EPDM polymers described herein may be analyzed as set out below to determine the effective unsaturation cement to contain about 1.25 grams of the polymer). Precipitate the polymer by pouring the solution into 400

---

[1] The spectrophotometer should be adjusted to the wavelength setting of maximum absorption since the bromine absorption curve is very sharp and even small errors in the wavelength setting cannot be tolerated.

ml. of isopropyl alcohol with vigorous stirring provided by a Waring Blendor.

(2) Filter the precipitated polymer and squeeze out the excess liquid.

(3) Dissolve the once precipitated polymer from Step 2 in 50 ml. of CCl$_4$, precipitate the polymer again by pouring into 400 ml. of isopropyl alcohol as in Step 1, and filter and remove excess liquid as in Step 2.

(4) Immediately redissolve the twice precipitated undried polymer from Step 3 in about 50 ml. of CCl$_4$ in a Waring Blendor. Filter the solution through glass wool into a 2-ounce narrow-mouthed bottle that can be stoppered to prevent evaporation. Determine the solids content by evaporation of duplicate 5.0 ml. samples of the polymer solution. A hypodermic syringe is convenient for measuring the polymer solutions.

(5) Set the spectrophotometer at the wavelength of 415 m$\mu$.

(6) Check the concentration of the 0.0125 M bromine solution daily before use by determining the absorbance of a known dilution.

(7) To the sample photometer cell, add 1.00 ml. of the 0.2% HgCl$_2$ solution as a catalyst, and 1.00 ml. of the standard 0.0125 M solution of bromine in CCl$_4$.

(8) Prepare a polymer blank by adding to the reference cell 0.50 ml. of the polymer solution from Step 4, 1.50 ml. of CCl$_4$ and 1.00 ml. of the 0.2% HgCl$_2$ solution, shake well, and place the photometer reference cell in the instrument.

(9) Discharge 0.50 ml. of the polymer solution[2] and 0.50 ml. of CCl$_4$ into the photometer cell containing the catalyst and bromine solution from a hypodermic syringe starting the stopwatch the instant of mixing (or the recorder if a recording spectrophotometer is used). Stopper the cell and thoroughly agitate the mixture before placing the cell in the instrument.

(10) Record the 415 m$\mu$ wavelength absorbance of the mixture at one minute intervals. Continue recording time and absorbance values until the faster addition rate of bromine to the double bonds is complete and the slower substitution reaction is well defined. (Usually 10–15 minutes is sufficient.) Prepare a plot from the resulting data of absorbance versus time to obtain an absorbance curve for the analyzed sample.

Calculations (1) Extrapolate the linear portion of the absorbance curve (i.e., the portion for the substitution reaction) for the analyzed sample to zero time[3], and record the absorbance value for zero time.

(2) Determine the final Br$_2$ concentration by inserting the absorbance value at zero time which was obtained above, and the slope of the calibration curve, in the following equation. The final Br$_2$ concentration, which is the concentration of Br$_2$ at the end of the rapid addition reaction, is then calculated.

Final Br$_2$ concentration in millimoles/liter =

$$\text{absorbance at zero time} \times \frac{1}{\text{slope of calibration curve}}$$

(3) Calculate the effective unsaturation level as carbon-to-carbon double bonds per 1000 carbon atoms in the polymer from the following equation:

Effective unsaturation level expressed as carbon-to-carbon double bonds per 1000 carbon atoms in the polymer $= \dfrac{(A-B)(C)(14)(100)}{(1000)(D)(E)}$ ---
[2] The sample size selected will permit analysis of polymers containing 2 to 10 C=C/1000 carbon atoms. Polymers with unsaturation levels above this range can be analyzed but the polymer concentration must be reduced proportionately.
[3] Extrapolation of the absorbance curve for the sample being analyzed gives essentially the same results as extrapolation of a kinetic plot but with considerable saving in time.

where:
A = initial Br$_2$ concentration, millimoles/liter
B = final Br$_2$ concentration, millimoles/liter
C = milliliters of solution in the sample photometer cell
D = % solids of polymer in the polymer solution (based on the weight of the polymer in grams/volume of the solvent in milliliters)
E = milliliters of the polymer solution in the sample photometer cell.

What is claimed is:

1. A curable blend of rubbery polymers consisting essentially of about 1–95 parts by weight of highly unsaturated rubbery polymer selected from the group consisting of rubbery polymers of homopolymerizable halogenated conjugated diolefins containing 4–10 carbon atoms, rubbery interpolymers of said halogenated conjugated diolefins and ethylenically unsaturated alpha monoolefins interpolymerizable therewith, rubbery interpolymers of conjugated diolefins containing 4–10 carbon atoms and ethylenically unsaturated nitriles interpolymerizable therewith selected from the group consisting of acrylonitrile and alkyl-substituted acrylonitriles wherein the alkyl substituent contains 1–5 carbon atoms, and rubbery interpolymers of said halogenated conjugated diolefins and said ethylenically unsaturated nitriles interpolymerizable therewith, and mixtures thereof, for each 99–5 parts by weight of a rubbery interpolymer which is the product of the interpolymerization of ethylene, at least one alpha monolefin containing 3–16 carbon atoms and an alkylidene norbornene in which the alkylidene group has from 2–20 carbon atoms, the rubbery interpolymer having a mol ratio of chemically bound ethylene to the alpha monolefin containing 3–16 carbon atoms between 80:20 and 20:80 and having an effective unsaturation level of at least 7 carbon-to-carbon double bonds per 1000 carbon atoms.

2. The blend of claim 1 wherein the rubbery interpolymer has an effective unsaturation level of about 7–30 carbon-to-carbon double bonds per 1000 carbon atoms and is present in an amount of about 1–50 parts by weight for each 99–50 parts by weight of the said highly unsaturated rubbery polymer.

3. The blend of claim 1 wherein the rubbery interpolymer is present in an amount of about 15–30 parts by weight for each 85–70 parts by weight of the highly unsaturated rubbery polymer.

4. The blend of claim 1 wherein the halogenated conjugated diolefin monomer and nitrile monomer which are chemically bound therein are present in an amount to provide at least 15 parts by weight of the said chemically bound monomers for each 100 parts by weight of the blend.

5. The blend of claim 1 wherein the rubbery interpolymer is the product of the interpolymerization of ethylene, propylene and 5-ethylidene-2-norbornene.

6. The blend of claim 5 wherein the rubbery interpolymer has an effective unsaturation level of at least 10 carbon-to-carbon double bonds per 1000 carbon atoms.

7. The blend of claim 6 wherein the rubbery interpolymer has an effective unsaturation level of about 10–25 carbon-to-carbon double bonds per 1000 carbon atoms and is present in an amount of about 15–30 parts by weight for each 85–70 parts by weight of the highly unsaturated rubbery polymer, and the halogenated conjugated diolefin monomer and the nitrile monomer which are chemically bound therein are present in an amount to provide at least 20 parts by weight of the said chemically bound monomers for each 100 parts by weight of the blend.

8. The blend of claim 1 wherein the highly unsaturated rubbery polymer is nitrile rubber, the rubbery interpolymer is the product of the interpolymerization of ethylene, at least one straight chain alpha monolefin having 3–10 carbon atoms and the polyunsaturated bridged ring compound, and the rubbery interpolymer is present in an amount of about 1–50 parts by weight for each 99–50 parts by weight of the nitrile rubber.

9. The blend of claim 8 wherein the rubbery interpolymer is present in an amount of about 15–30 parts by weight for each 85–70 parts by weight of the nitrile rubber.

10. The blend of claim 9 wherein the nitrile monomer which is chemically bound in the nitrile rubber is present in an amount to provide at least 25 parts by weight of chemically bound nitrile monomer for each 100 parts by weight of the blend.

11. The blend of claim 8 wherein the rubbery interpolymer is the product of the interpolymerization of ethylene, propylene and 5-ethylidene-2-norbornene.

12. The blend of claim 11 wherein the rubbery interpolymer has an effective unsaturation level of about 10–30 carbon-to-carbon double bonds per 1000 carbon atoms, the nitrile rubber is a copolymer of 1,3-butadiene and acrylonitrile and the acrylonitrile is chemically bound therein in an amount to provide at least 20 parts by weight of chemically bound acrylonitrile for each 100 parts by weight of the blend.

13. The blend of claim 12 wherein the rubbery interpolymer has an effective unsaturation level of about 10–20 carbon-to-carbon double bonds per 1000 carbon atoms and is present in an amount of about 15–30 parts by weight for each 85–70 parts by weight of the nitrile rubber, the nitrile rubber is a copolymer of 1,3-butadiene and acrylonitrile and the acrylonitrile is chemically bound therein in an amount to provide at least 33 parts by weight of chemically bound acrylonitrile for each 100 parts by weight of the blend.

14. The product obtained by curing the blend of claim 1 with a heat activated curing agent.

15. The vulcanizate of claim 14 wherein the rubbery interpolymer is present in an amount of about 15–30 parts by weight for each 85–70 parts by weight of the highly unsaturated rubbery polymer.

16. The vulcanizate of claim 14 wherein the rubbery interpolymer is the product of the interpolymerization of ethylene, propylene and 5-ethylidene-2-norbornene, the highly unsaturated rubbery polymer is nitrile rubber, and the blend is cured with sulfur.

17. The vulcanizate of claim 16 wherein the rubbery interpolymer has an effective unsaturation level of about 10–20 carbon-to-carbon double bonds for each 1000 carbon atoms, the nitrile rubber is a copolymer of 1,3-butadiene and acrylonitrile and the acrylonitrile is chemically bound therein in an amount to provide at least 20 parts by weight of chemically bound acrylonitrile for each 100 parts by weight of the blend.

18. The vulcanizate of claim 17 wherein the rubbery interpolymer is present in an amount of about 15–30 parts by weight for each 85–70 parts by weight of the nitrile rubber, the nitrile rubber is a copolymer of 1,3-butadiene and acrylonitrile and the acrylonitrile is chemically bound therein in an amount to provide at least 33 parts by weight of chemically bound acrylonitrile for each 100 parts by weight of the blend.

References Cited

UNITED STATES PATENTS

| | | | |
|---|---|---|---|
| 3,093,620 | 6/1963 | Gladding et al. | 260—80.78 |
| 3,179,718 | 4/1965 | Wei et al. | 260—889 |
| 3,224,985 | 12/1965 | Gladding et al. | 260—889 |
| 3,367,764 | 12/1967 | Gentile | 260—4 |

OTHER REFERENCES

Technical Report on "Nordel," Du Pont Corp., April 1964, p. 67.

MURRAY TILLMAN, Primary Examiner

M. J. TULLY, Assistant Examiner

U.S. Cl. X.R.

260—29.7, 30.6, 31.8, 33.6, 79.5, 80.78